United States Patent [19]
Feyerabend et al.

[11] Patent Number: 4,731,139
[45] Date of Patent: Mar. 15, 1988

[54] METHOD FOR PREPARING AN EMBOSSED LAMINATE CONTAINING AT LEAST TWO LAYERS

[75] Inventors: Ulrich Feyerabend, Weinheim; Gerhard Graab, Mannheim, both of Fed. Rep. of Germany

[73] Assignee: Firma Carl Freudenberg, Weinheim/Bergstr., Fed. Rep. of Germany

[21] Appl. No.: 933,340

[22] Filed: Nov. 21, 1986

Related U.S. Application Data

[63] Continuation of Ser. No. 702,920, Feb. 19, 1985, abandoned.

[30] Foreign Application Priority Data

Jun. 1, 1984 [DE] Fed. Rep. of Germany ....... 3420381

[51] Int. Cl.[4] .................. B32B 31/00; B26D 7/14
[52] U.S. Cl. .................... 156/154; 156/221; 264/139; 83/176
[58] Field of Search ............... 156/196, 212, 119, 220, 156/221, 222, 242, 244.24, 250, 254, 267, 228, 307.1, 308.2, 306.9; 264/139, 163, 162, 284, 293, 552; 83/176, 870, 874

[56] References Cited

U.S. PATENT DOCUMENTS

| 392,794 | 11/1888 | France | 156/254 |
| 801,673 | 10/1905 | Moore | 150/254 |
| 2,915,785 | 12/1959 | Valentini | 264/139 |
| 4,083,739 | 4/1978 | Stahl | 83/176 |

FOREIGN PATENT DOCUMENTS

| 1018209 | 10/1957 | Fed. Rep. of Germany. |
| 2103262 | 8/1972 | Fed. Rep. of Germany. |
| 83215 | 5/1964 | France. |
| 1498133 | 10/1967 | France. |
| 356274 | 9/1961 | Switzerland. |

Primary Examiner—Jerome Massie
Assistant Examiner—Louis Falasco
Attorney, Agent, or Firm—Felfe & Lynch

[57] ABSTRACT

A method for the production of an embossed laminate containing at least two layers, in which a thin top layer of stretchable material is backed with an unvulcanized bottom layer of rubber and pressed with a platen which has recesses which are arranged in a pattern and have a depth exceeding the thickness of the top layer, in which the two layers are bonded and solidified together by vulcanization, and in which at least the top layer is removed in the area of the projections by a cutting, milling or grinding process performed on a straight line, the laminate being exposed to a pressure and deformation acting perpendicular to its surface during the removal of the top layer in the area of the projections.

6 Claims, 4 Drawing Figures

METHOD FOR PREPARING AN EMBOSSED LAMINATE CONTAINING AT LEAST TWO LAYERS

This application is a continuation of application Ser. No. 702,920, filed Feb. 19, 1985 now abandoned.

The invention relates to a method for preparing an embossed laminate containing at least two layers, in which a thin top layer of stretchable material is backed with an unvulcanized underlayer of rubber and pressed to form projections having a reverse side which has pockets distributed in a pattern and having a depth exceeding the thickness of the top layer, in which the two layers are bound together and solidified by vulcanization, and in which at least the top layer is removed at the projections by a cutting, milling or grinding process performed rectilinearly.

German publication OS No. 21 03 262 described a method which results in a flattening of the faces of the projections. This is disadvantageous in certain applications of the laminate. If such a laminate is used as a floor covering, for example, deposits of dirt that are difficult to remove can form in normal use in the area of the faces of the projections, which is not very desirable from the hygienic or even esthetic point of view.

The use of such laminates for making shoe soles is also basically conceivable. The planar configuration of the cut surfaces of the projections, however, produces a nonresilient tread, which is not very satisfactory from the orthopedic point of view.

It is the object of the invention to improve the process described above such that, by a similarly simple process, rounded superelevated surfaces will be left at the projections when the latter are cut away.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

THE INVENTION

Figure 1:
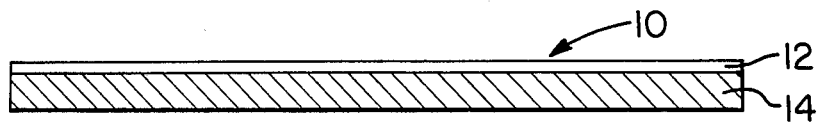
FIG. 1 generally depicts a laminate used in the method of the invention.

As a solution of this problem, a method of the kind described above is proposed, which is characterized in that the laminate is subjected to a deforming pressure acting perpendicular to its surface on the area of the projections while at least the top layer is being removed. Surprisingly, in spite of the use of a rectilinear cut, more material is removed in the peripheral area of the projections than in the central area. The different zones thus merge evenly into one another, causing the cut surfaces of the projections to be domed in the finished product.

The pressing can be performed between two dies having parallel pressing surfaces of unyielding material. This condition can be satisfied in the simplest case by the use of cylindrical rolls or planar press platens, and thus of dies which are not especially adapted to the relief pattern of the laminate to be worked. The preparation and use of such platens or rolls are accordingly nonproblematical.

The degree of doming achieved in the cut faces at the elevations depends on the degree of deformation to which the projections are subjected during the removal of at least the top layer from the area of the projections. A stronger compression of the projections accordingly also results in a more pronounced doming of the faces. At the same time, however, it must be considered that high degrees of deformation cause a considerable mechanical stress on the laminate material and therefore they must be used with discretion. This is a limitation on the degree to which greatly domed configurations can be produced by using planar dies.

In order nevertheless to achieve a high-domed configuration in critical cases, it is accordingly proposed, in an advantageous further development, to perform the pressing between dies of which at least one has bolster-like elevations on the pressing surface coinciding with the periphery of the projections and merging uniformly with the rest of the pressing surface. The pressing and deformation exercised on the projections during the cutting of the top layer is, as a consequence of this, greater in the area of the periphery of the projections than in their central part. The material can here shift easily into the adjacent spaces and apparently for this reason is better able to withstand the relatively greater pressure and deformation here than in the central area.

In itself, the plan outline and layout of the projections can be as desired. However, an especially pronounced doming takes place when the projections are spaced apart from one another and have a circularly defined area.

The pressing of the laminate can be performed between two dies of which at least one consists of a resiliently yielding material. The degree of deformation of the projections during the removal of at least the top layer, which is important, can thus be further controlled and hence also the degree of doming obtained in the cut surfaces at the projections.

In accordance with the above, it is possible to vary the resiliently yielding quality of the press dies that are used. However, it is better always to make one of the two dies harder than the other in order to hold the laminate in a definite position during the cutting of the top layer, and thus to avoid inequalities departing from the standard.

The top layer to be removed in the area of the projections can consist of virtually any stretchable material which can be tightly bonded by vulcanization or cementing to the rubber material forming the bottom layer. The top layer can be colored differently from the material of the bottom layer, making it possible to achieve esthetically attractive effects. It can furthermore consist of a dirt-repelling material to facilitate the removal of dirt. At the same time it is a special advantage that sensitivity to wear can be regarded as less important, inasmuch as the top layer itself overlaps the domed cut surface areas consisting of material of the bottom layer. The top layer is thus not as greatly exposed to wear.

EXAMPLES

EXAMPLE 1

The components named below are intensively mixed in a rubber kneader and drawn with a roll mill to layers of different thickness. The layer forming the bottom of the laminate has a thickness of about 2 to 6 mm, and the one forming the top layer has a thickness of about 0.5 to 1.5 mm.

The basic composition of both layers, expressed in parts by weight, includes 100 parts styrene-butadiene rubber, 5 parts zinc oxide, 1 part stearic acid, 40 parts active silica, 60 parts silica chalk, 2.5 parts triethanolamine, 2 parts paraffin, 2.3 parts sulfur, 1.2 parts benzothiazyl-2-cyclohexylsulfenamide (CBS) and 1 part of an anti-aging substance, such as one based on sterically hindered bisphenol. In addition, the material used for making the thinner upper layer contains 5 weight-parts of iron oxide red and 2 weight-parts of iron oxide yellow. The material thus has a brown color. The material used for the thicker bottom layer contains, in addition to the above-specified basic mixture, 7 weight-parts of carbon black and thus has a black color.

The two layer structure 10 of FIG. 1 is thus formed of a thin top layer 12 having expandable properties which is backed by an unvulcanized bottom layer 14.

After their formation, the two layers are fed continuously into a vulcanizing machine and prevulcanized, the thinner layer running against the vulcanizing machine cylinder heated to 160° C. The velocity is 60 meters per hour. Thus the two layers are united. At the same time, the portion of the material web facing the heated cylinder is prevulcanized such that, when the final vulcanization is performed in a press in which the elevated areas are formed, an intermixing of the materials of the differently colored layers doesn't take place at the interface. Nevertheless, a strong and uniform bond is achieved between the thicker and the thinner of the two layers.

Figure 2:
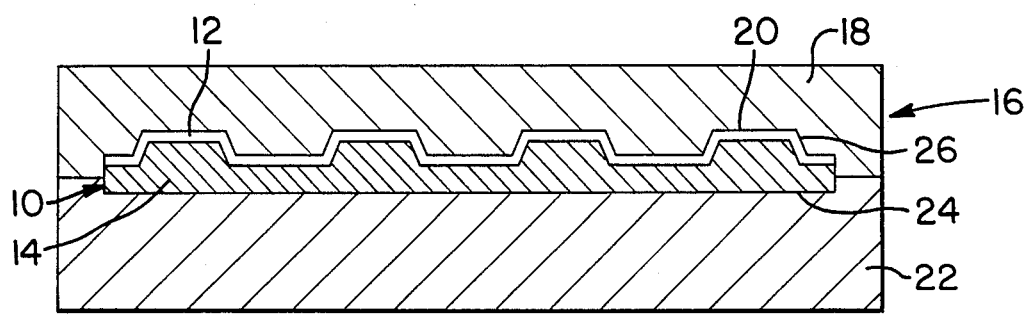
FIG. 2 illustrates an operation performed to the laminate of FIG. 1.

Referring to FIG. 2, the resulting two layer laminate 10 is inserted in a vulcanizing press 16 whose upper mold half 18, within the actual molding space, is provided with uniformly distributed, truncated cone-shaped depressions 20, and whose lower mold half 22, within the said actual molding space, has a plane surface 24.

When the two mold halves are brought together, the laminate 10 is pressed into the truncated cone-shaped recesses 20 of the upper mold half 18 and hardened in the course of the vulcanizing process. The laminate then has the cross-sectional form shown in FIG. 2.

The buttons 26 are arrayed in a square grid pattern. The squares measure 35 mm on a side. The diameter of the conical buttons rising above the surface of the top layer amounts at the smallest point to 27 mm, and the height 2 mm. Between the buttons, therefore, there are spaces into which the material can escape during the vertical pressing.

Figure 3:
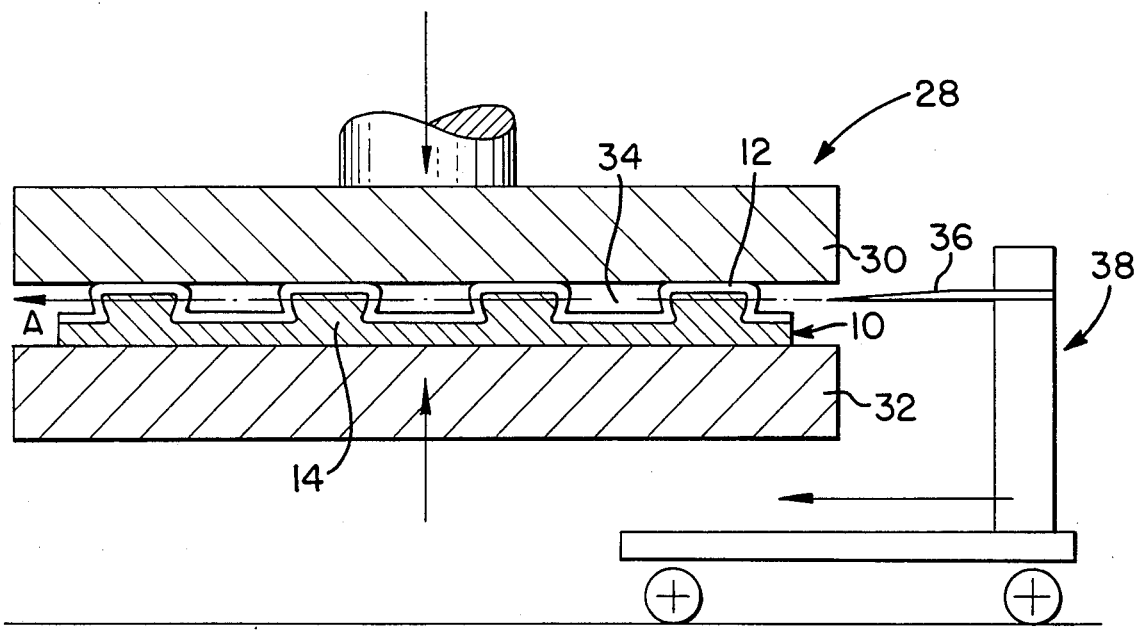
FIG. 3 depicts a step of the method of the invention performed on the laminate product of FIG. 2.
Figure 4:
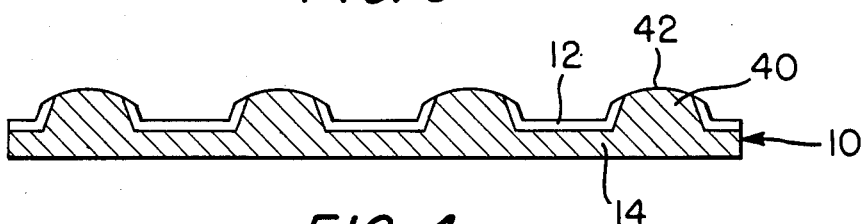
FIG. 4 illustrates the resulting laminate.

The thus patterned laminate 10, solidified and bearing the buttons projecting in relief above the top layer, is then transferred to a skiving machine 28 as in FIG. 3. This machine is composed of two cylindrical rollers 30 and 32 (shown as platens), compressing the material in a gap 34 between them plus a band knife 36 of a cutting device 38 disposed in the gap parallel to the axes of the cylindrical rolls. The line force with which the rolls bear against the opposite sides of the laminate amounts to 5000 N at a laminate width of 1020 mm. During the passage of the laminate and the splitting away of the top layer from the elevations, this pressure causes a resilient deformation of the buttons. The cut is made along the dashed line A shown in FIG. 3 in the direction of the arrow. After leaving the roll gap, the cut buttons 40 have a dome-like curvature in their faces 42 as shown in FIG. 4. These facilitate cleaning to an extraordinary degree when the laminate is used as a floor covering later on.

EXAMPLE 2

Using the manufacturing process identical to the conditions described in Example 1, first two layers of different thickness are produced, the layer forming the top having a thickness of 0.5 to 1.5 mm and the layer forming the bottom having a thickness of about 2 to 5 mm. An identical basic mixture is used for the production of both layers, including 100 weight-parts of rubber consisting of one third each of oil-stretched styrene-butadiene rubber, butadiene rubber and styrene-butadiene block polymer, 50 weight-parts of silica, 3 weight-parts of zinc oxide, 2 weight-parts stearic acid, 2 weight parts sulfur, 2 weight-parts activator, and 0.3 parts dithiocarbamate ultra-accelerator.

In addition, 6 weight-parts of titanium white are added to the composition intended for making the top layer, and 5 weight-parts of carbon black are added to the composition intended for making the bottom layer The top layer thus has a white color, the bottom layer a black color.

The two layers are laid one on the other and prevulcanized and finish-vulcanized in successive stages under the conditions described in Example 1. In this case, again, the final vulcanizing process includes the formation of the buttons elevated in relief above the surface. However, they are arrayed on a grid pattern of squares measuring 16 mm on a side, and, with a conical shape, they have a minimum diameter of 10 mm. The splitting off of the top layer in the area of the buttons is performed under the conditions described in Example 1. In this case again, a deforming pressure is exercised on the buttons during the skiving process. This results in the formation of domed faces on the cut buttons. The use of the material thus obtained as soles for footwear is thereby favored.

It will be understood that the specification and examples are illustrative but not limitative of the present invention and that other embodiments within the spirit and scope of the invention will suggest themselves to those skilled in the art.

We claim:

1. A method for making an embossed laminate of at least two layers, comprising: backing a thin top layer of stretchable material with an unvulcanized bottom layer of rubber; pressing the backed thin top layer with a counterplaten having recesses distributed pattern-wise and having a depth exceeding the thickness of the top layer to form projections; bonding and solidifying the two layers together by vulcanization to form a laminate with a surface having projections; exposing the surface of the laminate having projections to pressure acting perpendicularly to said surface to deform said projections, said pressure resulting from pressing surfaces extending parallel to one another; and rectilinearly removing at least a top layer of said deformed projections while under pressure by a cutting, milling or grinding process to form a domed surface on the projections.

2. The method of claim 1, wherein each of the projections has a periphery and the pressing is performed between two dies at least one of which has a pressing surface having bolster-like elevations coinciding with the periphery of the projections, and the elevations merge uniformly with the rest of the pressing surface.

3. The method of claim 2, wherein the pressing is performed between two rolls having axes extending parallel to one another.

4. The method of claim 1, wherein the pressing is performed between one die of unyielding material and one die of resiliently yielding material.

5. The method of claim 1, wherein the pressing is performed between two dies of resiliently yielding material.

6. The method of claim 5, wherein the resilient yielding material of each of the dies has different resilient yielding characteristics.

* * * * *